United States Patent [19]

Yoshida et al.

[11] Patent Number: 4,692,598
[45] Date of Patent: Sep. 8, 1987

[54] TEMPERATURE CONTROLLER SYSTEM

[75] Inventors: Naoki Yoshida, Sagamihara; Nobutoshi Kobayashi, Tokyo, both of Japan

[73] Assignee: Yamato Scientific Co., Ltd., Tokyo, Japan

[21] Appl. No.: 829,715

[22] Filed: Feb. 14, 1986

Related U.S. Application Data

[62] Division of Ser. No. 526,267, Aug. 25, 1983.

[30] Foreign Application Priority Data

Oct. 16, 1982 [JP] Japan ............................... 57-181778

[51] Int. Cl.$^4$ ............................................ H05B 1/02
[52] U.S. Cl. .................................... 219/497; 219/501; 219/413; 323/366
[58] Field of Search ............... 219/494, 501, 497, 506, 219/504, 483, 486, 413, 398, 508, 330, 331; 307/38–41; 323/235, 236, 319, 366

[56] References Cited

U.S. PATENT DOCUMENTS

| | | | |
|---|---|---|---|
| 4,307,775 | 12/1981 | Saunders et al. | 219/279 |
| 4,309,592 | 1/1982 | Le Boeuf | 219/308 |
| 4,320,285 | 3/1982 | Koether | 219/497 |
| 4,393,300 | 7/1983 | Proctor | 219/497 |

Primary Examiner—M. H. Paschall
Attorney, Agent, or Firm—Maurice E. Gauthier

[57] ABSTRACT

A temperature controller for an incubator or an oven for keeping the temperature in a chamber at a constant level by controlling the energization of heaters. The temperature controller is provided with two temperature control systems, each of which comprising a sensor for detecting the temperature in the chamber, a thermostat for setting a temperature which is aimed at in the chamber, an error amplifier for detecting a difference between both output levels of the sensor and temperature setting means, and an electric power control circuit for controlling the energization of the heaters in correspondence with the output pulse-length of the circuit.

2 Claims, 7 Drawing Figures

FIG. 5
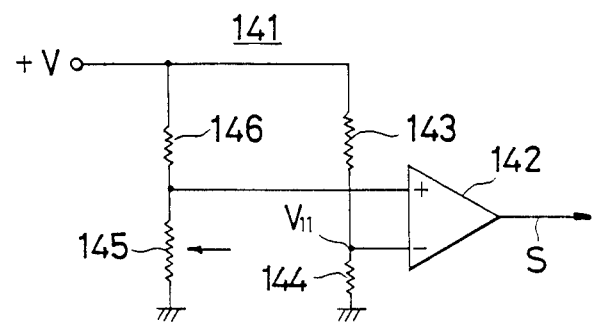
FIG. 6
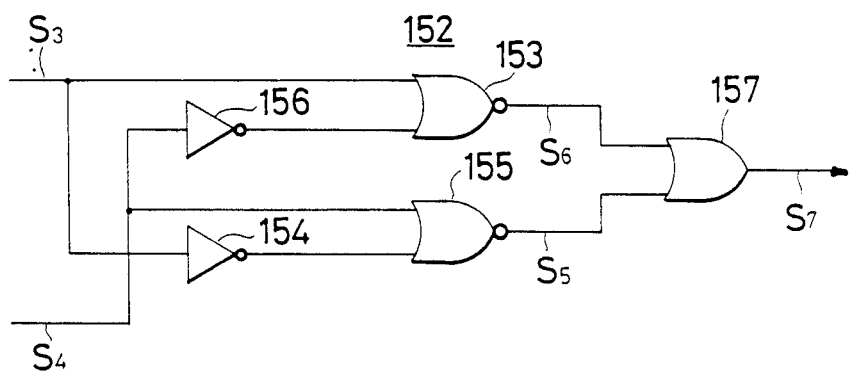
FIG. 7
| HTR. ACT. SIG. S3 | THYR. DR. SIG. S4 | THR. JDG. OUT. S6 | THYR. JDG. OUT. S5 |
|---|---|---|---|
| H | H | L | L |
| H | L | L | H |
| L | H | H | L |
| L | L | L | L |

TEMPERATURE CONTROLLER SYSTEM

This is a divisional of co-pending application Ser. No. 526,267 filed on 08/25/83.

BACKGROUND OF THE INVENTION

The present invention generally relates to a temperature controller. In more detail, the invention relates to a temperature controller which is suitable for controlling the temperature in an incubator or an oven.

In the incubator which is used for the cultivation of microorganisms or cells or the oven which is used in various kinds of temperature tests for materials or parts, it is required that the temperature in a chmaber is kept at a desired level during the cultivation or test period. Hence, there are provided a heater and a temperature controller which controls the electric current as supplied through the heater and keeps the temperature in the chamber at the constant level.

FIG. 1 shows a conventional example of a temperature control system in the apparatus as mentioned above.

A first temperature controller 6 and a second temperature controller 8 respectively detect the temperature in the chamber and controls a first power controller 7 and a second power controller 9 which correspond to the first temperature controller 6 and the second temperature controller 8 respectively. The temperature of the first temperature controller 6 is the one which is aimed at, and the second temperature controller 8 has a temperature which is higher than the set temperature of the first temperature controller 6. The first temperature controller 6 turns on the first power controller 7 if the temperature in the chamber is lower than the set temperature, while the second temperaure controller 8 turns on the second power controller 9 if the temperature in the chamber is lower than the set temperature. Therefore, in case the temperature in the chamber is under the control of the first temperature controller 6, the second power controller 9 is always turned on, and the electric current which is supplied through the heater 5 is controlled by the first temperature controller 6. If there is caused a trouble in the first temperature controller 6, so that the temperature in the chamber starts to be raised, the control by the second temperature controller 8 is started.

As the result that such control is effected, there may be brought about problems as stated in the following (1) and (2).

(1) In case there is caused some abnormality in the direction in which the temperature in the chamber is lowered, it is impossible to achieve the object to keep the temperature at the constant level as in the conventional example as mentioned before.

(2) since the control is effected with a high set temperature in the chamber in case there is caused the abnormality in the direction in which the temperature in the chamber is raised, unfavourable influence may be exerted upon the sample.

SUMMARY OF THE INVENTION

Therefore, an object of the present invention is to provide a temperature controller for an incubator which can reliably prevent the temperature from being excessively raised.

Another object of the invention is to provide a temperature controller which makes it possible that the temperature control in case there is not caused any abnormality may be expected as it is even in case there is caused the abnormality.

BRIEF DESCRIPTION OF THE DRAWINGS

FIGS. 4, 5 and 6 are circuit diagrams showing in detail a temperature sensor judging circuit, a potentiometer judging circuit and a heater and thyristor judging circuit respectively in a temperature controller; and FIG. 7 is a table which is used for explaining the operation of the arrangement which is shown in FIG. 5.

DETAILED DESCRIPTION OF THE INVENTION

The present invention resides in an improvement in a temperature controller for an incubator or an oven for keeping the temperature in a chamber at a constant level by controlling the energization of heaters wherein the temperature controller is provided with two temperature control systems, each of which comprises a sensor for detecting the temperature in the chamber, a temperature setting means for setting a temperature which is aimed at in the chamber, an error amplifier for detecting a difference between both output levels of said sensor and temperature setting means, a phase-length modulation circuit for providing a pulse of a time length which corresponds to the difference output of said amplifier and an electric power control circuit for controlling the energization of the heaters in correspondence with the output pulse-length of said circuit, and the actuation condition in each said system is monitored by the information as to whether the heaters are energized as well as the output of each of said sensor, temperature setting means, error amplifier and pulselength modulation circuit in each said system, so as to be able to switch to one of said two systems which is in the normal state in case there is caused some trouble in the other system, thereby maintaining the same temperature control.

In the below, an explanation will be given in respect of the embodiment in accordance with the present invention with reference to the accompanying drawings.

Figure 2:
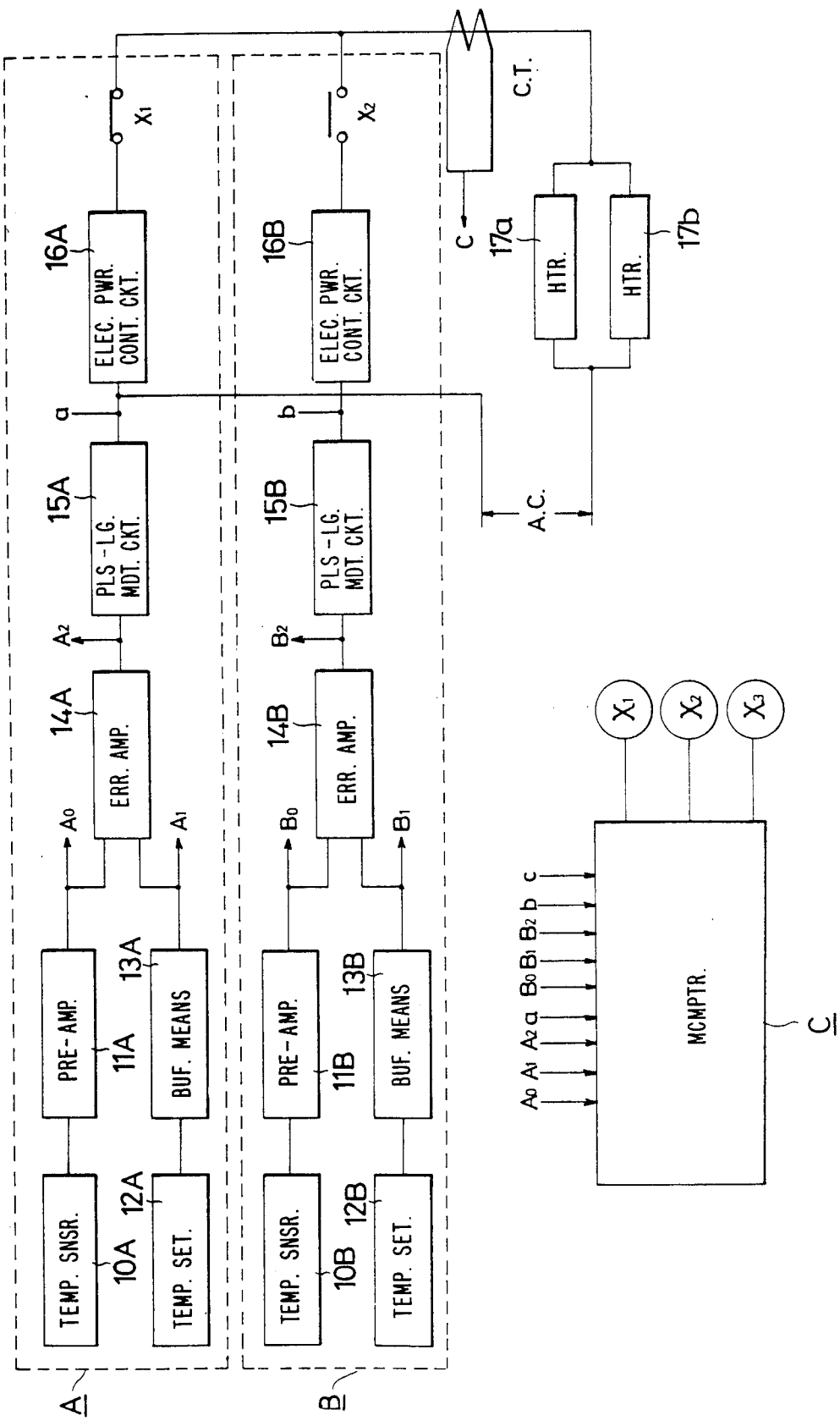
FIG. 2 is a view showing one embodiment of a temperature controller in accordance with the present invention.
Figure 3:
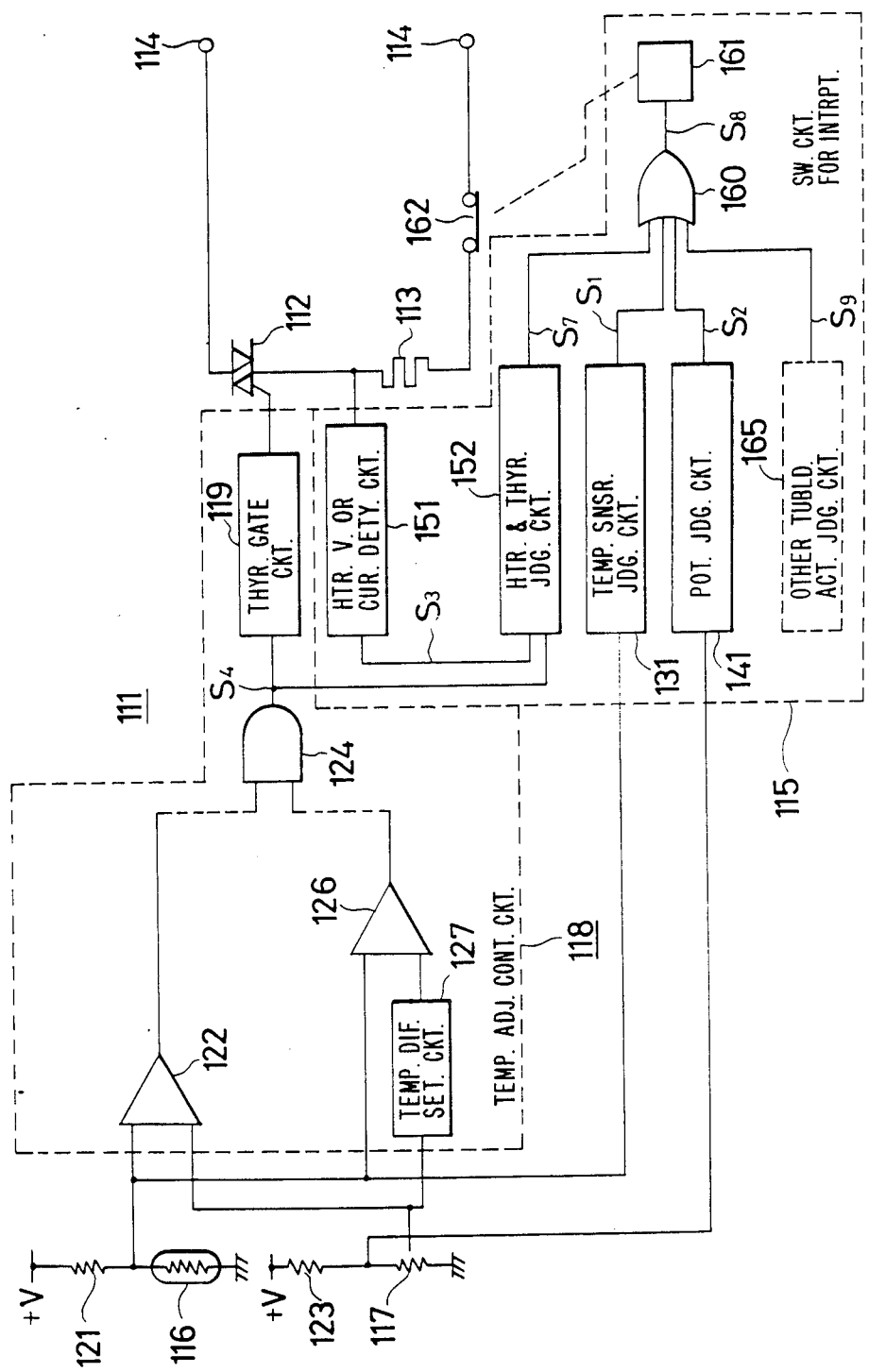
FIG. 3 is a block diagram showing another embodiment of a temperature controller in accordance with the present invention.

FIG. 2 is a view showing one embodiment of the temperature controller for an incubator in accordance with the present invention. Reference characters A and B denote temperature control systems of the same function. Reference character C denotes a microcomputer which effects a judgement to switch these control systems in correspondence with the generation of the abnormality.

The temperature control system A comprises a temperature sensor 10A for detecting the temperature in the chamber, a pre-amplifier 11A for converting an output of the sensor 10A into a predetermined voltate $A_0$, a temperature setting means 12A such as a potentiometer for setting the temperature which is aimed at in the chamber, a buffer means 13A for converting the temperature which is aimed at in the chamber into a predetermined voltage level $A_1$, an error amplifier 14A for detecting a difference voltage $A_2 = A_1 - A_0$ betweem the detected temperature $A_0$ and the temperature $A_1$ which is aimed at, a pulse-length modulation circuit 15A which develops a pulse-length modulation signal (a) which corresponds to a voltage level of the difference value $A_2$ as an output, an electric power control circuit 16A which energizes heaters 17a and 17b during the ON time period of the pulse-length modulation signal (a) and a contact $X_1$ of a relay $X_1$ which is driven by the computer C. The other temperature control system B is also likewise constituted. That is, it comprises a temperature sensor 10B, a pre-amplifier 11B, a temperature setting means 12B, a buffer means 13B, an error amplifier 14B, a pulse-length modulation circuit 15B, an electric power control circuit 16B and a contact $X_2$ of a relay $X_2$ which is driven by the computer C. A current transformer C.T. Detects whether the electric current which flows through the heaters 17a, 17b exists or not and provides the information (c) to the microcomputer C. Besides the information from the current transformer C.T., the microcomputer C receives information concerning the detected temperatures $A_0$ and $B_0$, the temperatures $A_1$ and $B_1$ which are aimed at, the difference values $A_2=A_1=A_0$ and $B_2=B_1=B_0$ and the pulse-length modulation signals (a) and (b) from the temperature control systems A and B, so as to actuate the relay $X_1$ and $X_2$ and drives a buzzer Bz.

Usually, the contact $X_1$ of the relay $X_1$ is closed so that the temperature control system A is connected to the heaters 17a, 17b in the arrangement as mentioned above. The contact $X_2$ of the relay $X_2$ is opened so that the temperature control system B is cut off from the heaters, but it may be actuated in the same manner as in the temperature control system A during the time that temperature is controlled.

If some malfunction is caused in the temperature control due to a disconnection or short-circuit in the temperature sensor 10A, a disconnection in the temperature setting means 12A or trouble in the error amplifier 14A and the pulse-length modulation circuit 15A or the electric power control circuit 16A in the temperature control system A in case the temperature is being controlled as mentioned above, the microcomputer C judges this so as to release the driving of the relay $X_1$ and energize the relay $X_2$, thereby coupling the temperature control system B to the heaters 17a, 17b. The microcompute C judges the abnormality in the temperature control system A as follows.

As to the temperature sensor 10A, the microcomputer judges the abnormality depending upon whether the value of the detected temperature $A_0$ is at the predetermined level. As to the temperature setting means 12A, the microcomputer likewise judges the abnormality depending upon whether the temperature $A_1$ which is aimed at is at the predetermined level. As to the error amplifier 14A, the microcomputer judges the abnormality depending upon whether the value of $A_2=A_1-A_0$ in accordance with the calculation in the microcomputer coincides with the difference value $A_2$ of the amplifier. As to the pulse-length modulation circuit 15A, the microcomputer judges the abnormality based on the difference value $A_2$ of the duty of the pulse-length modulation signal (a) and the output of the current transformer C.T. The microcomputer judges abnormalities in control system B in the same manner. In case the abnormality is caused in the temperature control system B in the state in which the temperature control system is not connected to the heaters 17a, 17b, the buzzer Bz is driven so as to inform the operator that the abnormality is caused in the temperature control system B.

Thus, since there are provided two temperature control ssytems which have the same set temperature so as to make it possible to switch to one of them which is in the normal state if the abnormality is caused in the other system in accordance with this temperature controller, it is possible to provide the temperature controller which ensures the operation which is the same as in the normal state even if there is caused the abnormality.

Now, there is shown another temperature controller which provides a solution to the problems of the prior art in FIG. 3–FIG. 7.

In a temperature controller 111, a heater 113 is connected in series to an electric power source 114 via a thyristor 112. A switch circuit 115 provides a current interruption in the event of an abnormality in this series circuit.

The thyristor 112 is turned on and off by a thyristor gate circuit 119 in a temperature adjusting control circuit 118 to which are connected a temperature setting potentiometer 117 and a temperature sensor 116 provided in a controlled chamber. In other words, the temperature sensor 116 is connected between the electric power source +V and the earth via a resistor 121 which is connected thereto in series. And the connection point between the temperature sensor 116 and the resistor 121 is connected to an input terminal of a main comparison amplifier circuit 122. In addition, a potentiometer 117 is likewise connected between the electric power source +V and the earth via a resistor 123 which is connected thereto in series. And the connection point between the potentiometer 117 and the resistor 123 is connected to a reference input terminal of the main comparison amplifier 122.

Hence, if the temperature in the controlled chamber is lower than the set temperature which is set in the potentiometer 117, the comparison input which is supplied as an input from the temperature sensor 116 to the main comparison amplifier 122 is lower than the comparison input which is supplied as an input from the potentiometer 117, thereby sending out a comparison output which is at a logic "H" level from the output terminal of the main comparison amplifier 122. And this comparison output is supplied as an ON control signal to the thryistor gate circuit 119 via an AND circuit 124 so that the thyristor 112 is turned on. As the result, the temperature in the chamber is raised by the heater 113.

Then, if the temperature in the chamber becomes higher than the set temperature, the comparison input from the temperature sensor 116 becomes higher than the reference input from the potentiometer 117, so that the output of the main comparison amplifier 122 is lower from the logic "H" level to the logic "L" level. As the result, the thyristor 112 is turned off via the thyristor gate circuit 119. Hence, the temperature in the chamber becomes lowered.

Then, if the temperatre in the chamber becomes lower than the set temperature, the thyristor 112 is again turned on so as to raise the temperature by the heater. Thus, the thyristor 112 is turned on and off in the same manner as mentioned before, thereby controlling the temperature in the chamber so as to become constant at the set temperature of the potentiometer 117.

In addition to this, the output of the connection point between the temperature sensor 116 and the resistor 121 is connected to the comparison input terminal of a sub-comparison amplifier 126, and the output of the connection point between the potentiometer 117 and the resistor 123 is lowered by an amount which corresponds to the predetermined temperature difference in a temperature difference setting circuit 127 connected to the reference input terminal of the sub-comparison amplifier 126.

Therefore, if the temperature in the chamber becomes lower than the sum of the set temperature which is set in the potentiometer 117 and the temperature difference which is set in the temperature difference setting circuit 127, the output of the sub-comparison amplifier 126 is at the logic "H" level, and this comparison output is supplied to the AND circuit 124 as the other condition input. Then, the output of the main comparison amplifier 122 is developed as the output from the AND circuit 124 as it is.

On the contrary, if the temperature in the chamber becomes higher than the sum of the set temperature which is set in the potentiometer 17 and the temperature difference which is set in the temperature difference setting circuit 127, the output of the sub-comparison amplifier 126 is at the logic "L" level. Thus, the output of the AND circuit 124 is forced to be at the logic "L" level, thereby turning off the thyristor 112.

Hence, if the temperature in the chamber is abnormally raised while the thyristor 112 is controlled by the output of the main comparison amplifier 122, the thyristor 112 is turned off by the output of the sub-comparison amplifier 126, thereby preventing the temperature from being excessively raised.

The temperature in the chamber is effectively prevented from being excessively raised in accordance with the arrangement as mentioned above in case the temperature sensor 116, the potentiometer 117 and the thyristor 112 are actuated in the normal state. There is provided a switch circuit 115 which is constituted as stated hereinafter for interruption when there is caused some abnormality in those element so as to protect them. Since each system inclusive of the main comparison amplifier 122 or the sub-comparison amplifier 126 uses in common the temperature sensor 116, the potentiometer 117 and thyristor 112 so as to turn on and off the thyristor 112, it is impossible to detect the abnormality in case there is caused some trouble in those elements. Then, the switch circuit 115 for interruption when there is caused the abnormality receives the abnormality detection output in direct from the temperature sensor 116, the potentiometer 117 and the thyristor 112.

Figure 1:
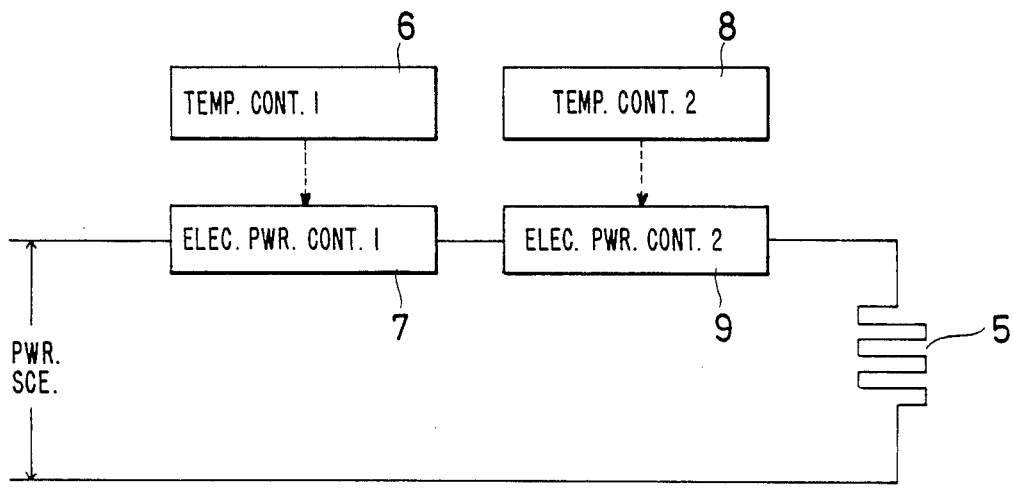
FIG. 1 is a view showing a conventional temperature control system.
Figure 4:
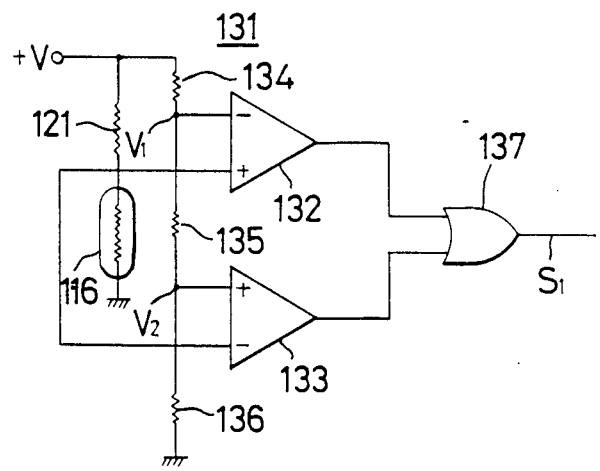

First of all, the connection point between the temperature sensor 116 and the resisor 121 is connected to a temperature sensor judging circuit 131. As shown in FIG. 4, the temperature sensor judging circuit 131 comprises a comparator 132 for judging a disconnection and another comparator 133 for judging a short-circuit. Between the electric power source +V and the earth, there is connected a series circuit of first, second and third resistors 134, 135 and 136. And a divided voltage $V_1$ which is obtained at the connection point between the first resistor 134 and the second resistor 35 is supplied to the negative input terminal of the comparator 132 for judging a disconnection, and a divided voltage $V_2$ which is obtained at the connection point between the second resistor 135 and the third resistor 136 is supplied to the positive input terminal of the comparator 133 for judging a short-circuit. Then, the output voltage which is obtained from the temperature sensor 116 is supplied to the positive input terminal of the comparator 132 for judging a disconnection and the negative input terminal of the comparator 133 for judging a short-circuit.

In the arrangement as shown in FIG. 4, there is a relationship such as V $V_1$ $V_2$ 0 among the voltages $V_1$, $V_2$ and the power source voltage +V. If a disconnection is caused in the temperature sensor 116, the voltage at the connection point between the temperature sensor 116 and the resistor 121 becomes equal to the power source voltage V. If a short-circuit is caused, the voltage of the temperature sensor 116 becomes equal to the earth voltage 0. On the contrary, the voltage of the temperature sensor 116 is between the voltages $V_1$ and $V_2$ if there is caused neither disconnection nor short-circuit.

And in case there is not caused any trouble in the temperature sensor 116, both the outputs of the comparator 132 for judging a disconnection as well as the comparator 133 for judging a short-circuit are at the logic "L" level.

On the contrary, if the disconnection is caused in the temperature sensor 116, the output of the comparator 132 for judging a disconnection varies so as to be at the logic "H" level. And if the short-circuit is caused, the output of the comparator 133 for judging a short-circuit varies so as to be at the logic "H" level. The outputs of these comparators 132 and 133 are developed as the output $S_1$ of the temperature sensor judging circuit 131 via an OR circuit 137. Thus, it is possible to judge the generation of the abnormality by the fact that the output of the temperature sensor judging circuit 131 is at the logic "H" level.

Then, the connection point between the potentiometer 117 and the resistor 123 is connected to a potentiometer judging circuit 141, As shown in FIG. 5, the potentiometer judging circuit 141 comprises a comparator 142 for judging a disconnection. And the divided voltage $V_{11}$ which is obtained at the connection point between the resistors 143 and 144 for dividing voltage which are connected between the power source +V and the earth is supplied to the negative input terminal thereof, and the voltage which is obtained at the connection point between resistors 145 and 146 is supplied to the positive input terminal.

In the arrangement which is shown in FIG. 5, a power source voltage V which has a relationship such as V $V_{11}$ is supplied to the positive input terminal of the comparator 142 in case the disconnection is caused in the potentiometer 145, so that the output of the comparator 142 varies from the logic "L" level to the logic "H" level. And this output from the comparator 142 is developed as a judging output of the potentiometer judging circuit 141.

Now, there is provided a heater voltage (current) detection circuit 151 (FIG. 3) for the heater 113. In case an actuation voltage (or current) is applied on the heater 113, a heater actuation signal $S_3$ which is at the logic "H" level is obtained, and this signal is supplied to a heater and thyristor judging circuit 152 as the first condition input. At the same time, a thyristor drive signal $S_4$ which is supplied as an input to the thyristor gate circuit 119 is supplied to the heater and thyristor judging circuit 152 as the second condition inpu.

In the heater and thyristor judging circuit 152, the heater actuation signal $S_3$ is supplied to the first NOR circuit 153 as the first condition signal and to the second NOR circuit 155 via an inverter 154 as the first condition signal as shown in FIG. 6. The thyristor drive signal S₄ is supplied to the first NOR circuit 153 via an inverter 156 as the second condition signal and in direct to the second NOR circuit 153 as the second condition signal.

In the arrangement which is shown in FIG. 6, if both the heater actuation signal S₃ and the thyristor drive signal S₄ are at the logic "H" or "L" level, the thyristor 112 responds as instructed by the thyristor drive signal S₄ so as to indicate that the heater 113 is actuated in the normal state. Therefore, the first and second NOR circuits 153 and 155 develop the thyristor judging output S₅ and the heter judging output S₆ which are at the logic "L" level and which indicate that the thyristor 112 and the heater 113 are respectively in the normal state.

On the contrary, in case the heater actuation signal S₃ is at the logic "L" level despite the fact that the thyristor drive signal S₄ is at the logic "L" level, the heater judging output S₆ of the first NOR circuit 153 is at the logic "H" level and the thyristor judging output S₅ of the second NOR circuit 155 is at the logic "L" level as shown in FIG. 7, thereby developing a judging output S₆ which is at the logic "H" level and which indicates that the disconnection is caused in the heater 113.

In case the heater actuation signal S₃ is at the logic "H" level despite the fact that the thyristor drive signal S₄ is at the logic "L" level, the heater judging output S₆ of the first NOR circuit 153 is at the logic "L" level and the thyristor judging output S₅ of the second NOR circuit 155 is at the logic "H" level as shown in FIG. 7, thereby developing a judging output S₅ which is at the logic "H" level and which indicates that the short-circuit trouble is caused in the thyristor 112.

Thus, the judging outputs S₆ and S₅ which are obtained from the first and second NOR circuits 53 and 55 are sent out via the OR circuit 157 as the output S₇ of the heater and thyristor judging circuit 152.

The judging outputs S₁, S₂ and S₇ of the temperature sensor judging circuit 131, the potentiometer judging circuit 141 and the heater and thyristor judging circuit 152 are supplied via an OR circuit 160 to an interruption control circuit 161 as an interruption control signal S₈, so that an interruption switch 162 which is provided in series with the thyristor 112 and the heater 113 is opened in case the interruption control signal S₈ is at the logic "H" level, thereby making it possible that the temperature in the controlled chamber is prevented from being excessively raised.

In the description hereinabove, the explanation has been given in respect of the case in which the abnormality caused in the temperature sensor 116, the potentiometer 117, the heater 113 and the thyristor 112 is judged. However, in addition to this, it is also possible to provide another trouble judging circuit 165 which judges the trouble caused in the actuation of other circuit elements if occasion demands, so that the output S₉ thereof is supplied via the OR circuit 160 to the interruption control circuit 161.

What is claimed is:

1. For use with a heater connected in series with a power source and arranged in a chamber or the like to maintain the temperature in said chamber at a selected level, a temperature controller comprising:
    a temperature sensor in said chamber;
    a temperature setting means adapted to be set at said selected level;
    a main comparator circuit for developing an OFF-control output when the detected output of said temperature sensor is higher than the output of said temperature setting means;
    a sub-comparator circuit for developing an OFF-control output when the detected output of said temperature sensor exceeds an overheating level which is higher than said selected level;
    a control output circuit for emitting an "AND" output signal of the output signal of said main comparator circuit and said sub-comparator circuit as the OFF-control output for a switch which is connected in series with said heater and said power source;
    a temperature judging circuit for detecting a malfunction of said temperature sensor;
    a temperature setting means judging circuit for detecting a malfunction of said temperature setting means; and
    a switch circuit for interrupting the supply of power from said power source to said heater when a malfunction is detected by either of said judging circuits;
    said temperature setting means judging circuit comprising a third comparator for judging a disconnection;
    first and second resistors connected in series between said power source and ground;
    third and fourth resistors connected in series between said power source and ground;
    means for applying a divided voltage obtained at a connection point between said first and second resistors to the negative input terminal of said third comparator; and means for applying a divided voltage obtained at the connection point between said third and fourth resistors to the positive input terminal of said third comparator, whereupon the output of said third comparator constitutes the output of said temperature setting means judging circuit.

2. The temperature controller of claim 1 wherein said temperature judging circuit comprises: a fourth comparator for judging a disconnection; a fifth comparator for judging a short-circuit; fifth, sixth and seventh resistors connected in series between said power source and ground; means for applying a divided voltage obtained at a connection point between said fifth and sixth resistors to the negative input terminal of said fourth comparator; means for applying a divided voltage obtained at a connection point between said sixth and seventh resistors to the positive input terminal of said fifth comparator; and means for applying the output voltage from said temperature sensor to the positive input terminal of said fourth comparator and to the negative input terminal of said fifth comparator; whereupon the outputs of said fourth and fifth comparators constitute the output of said temperature judging circuit.

* * * * *